United States Patent Office 3,424,208
Patented Jan. 28, 1969

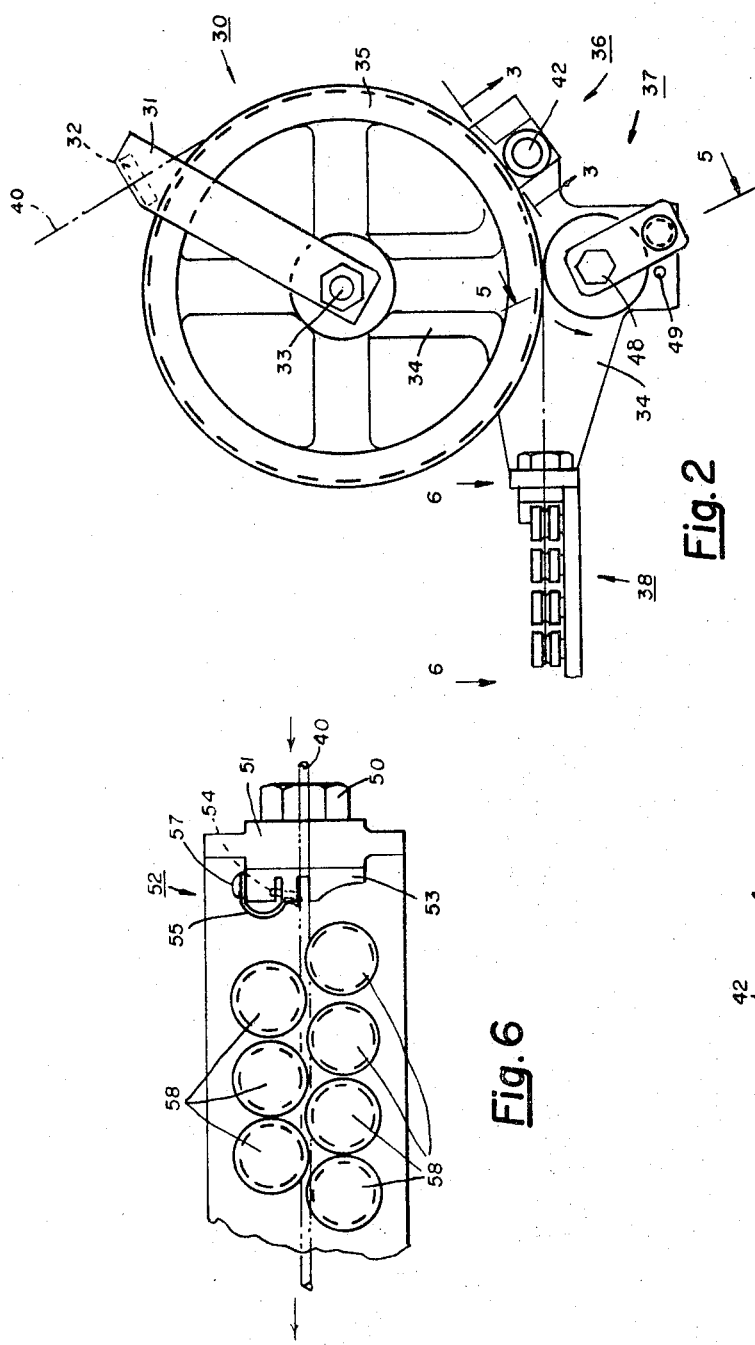

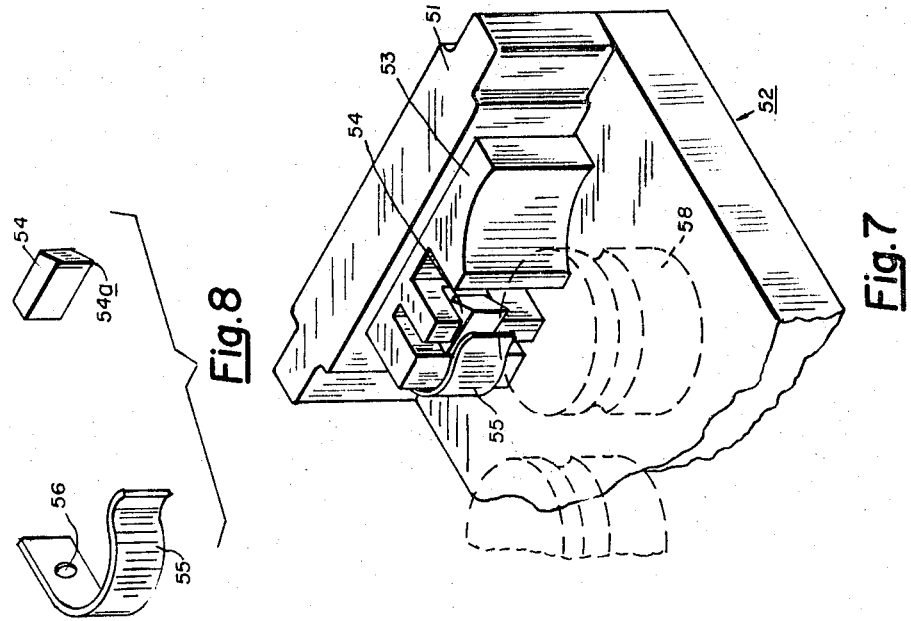
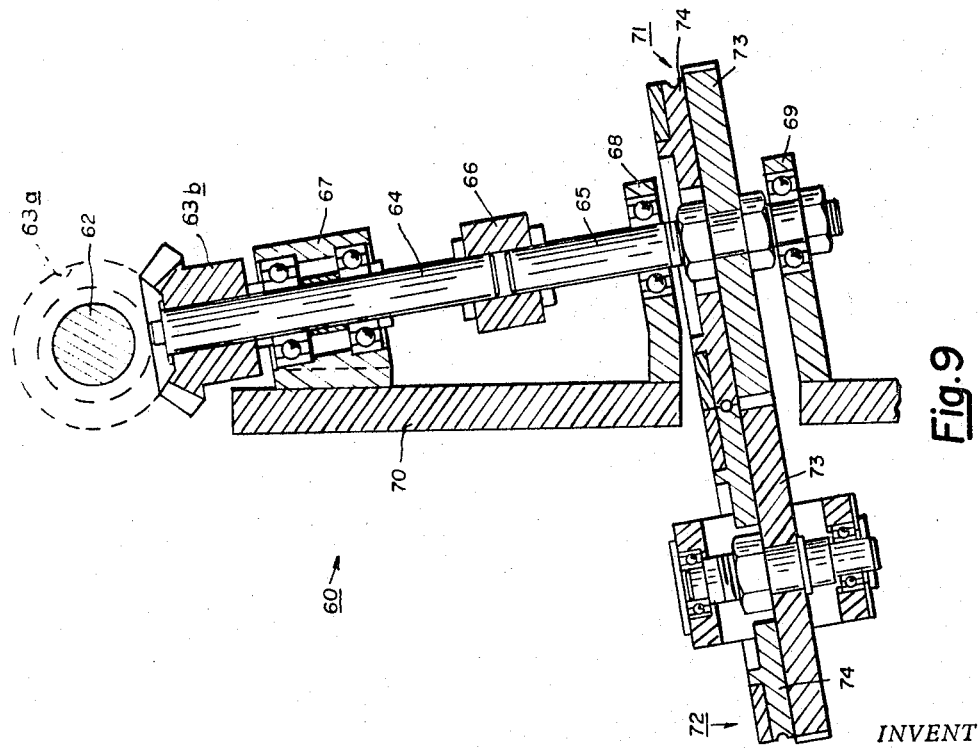

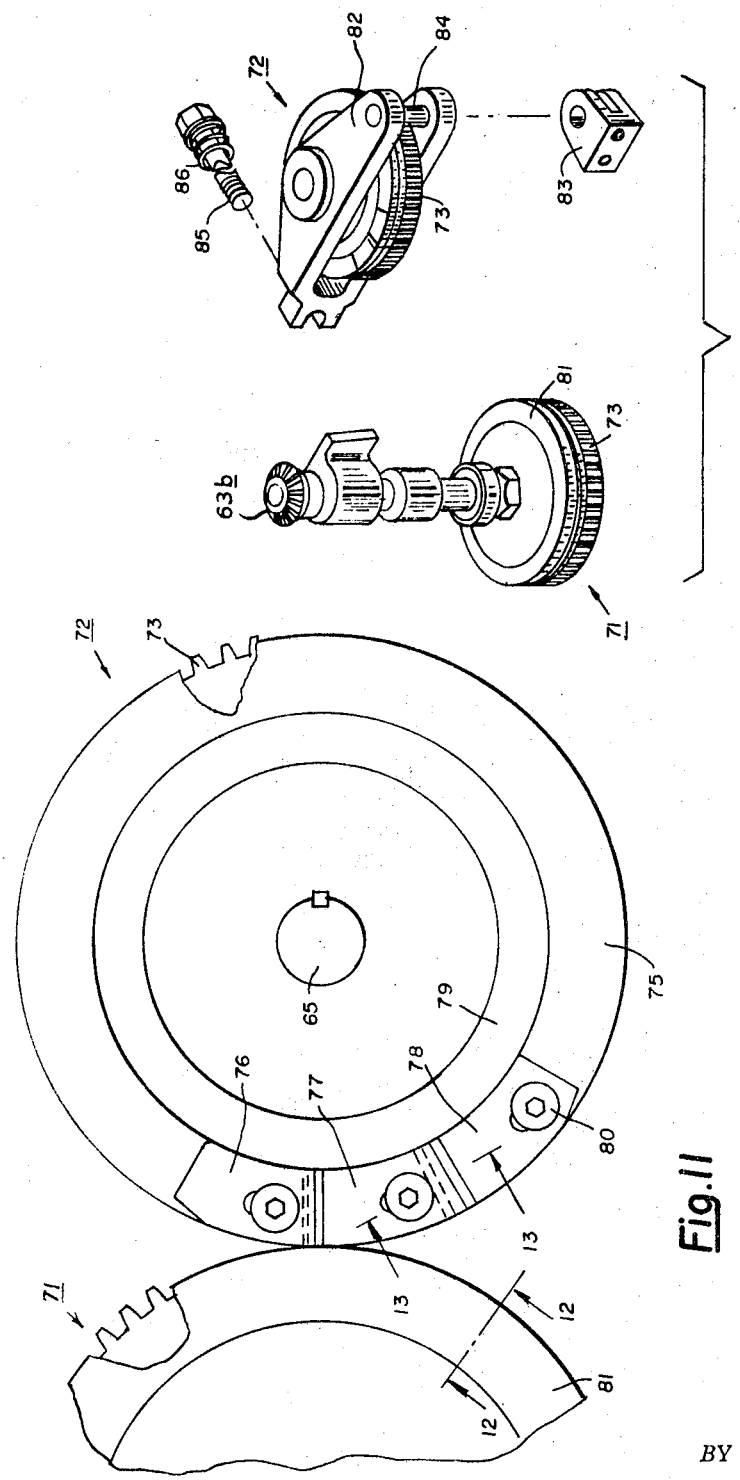
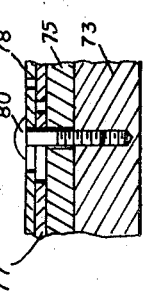
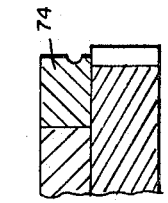

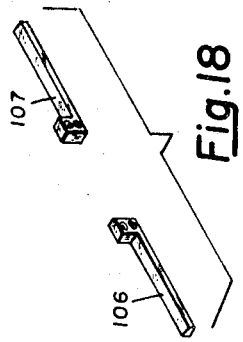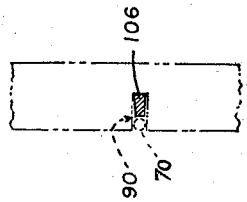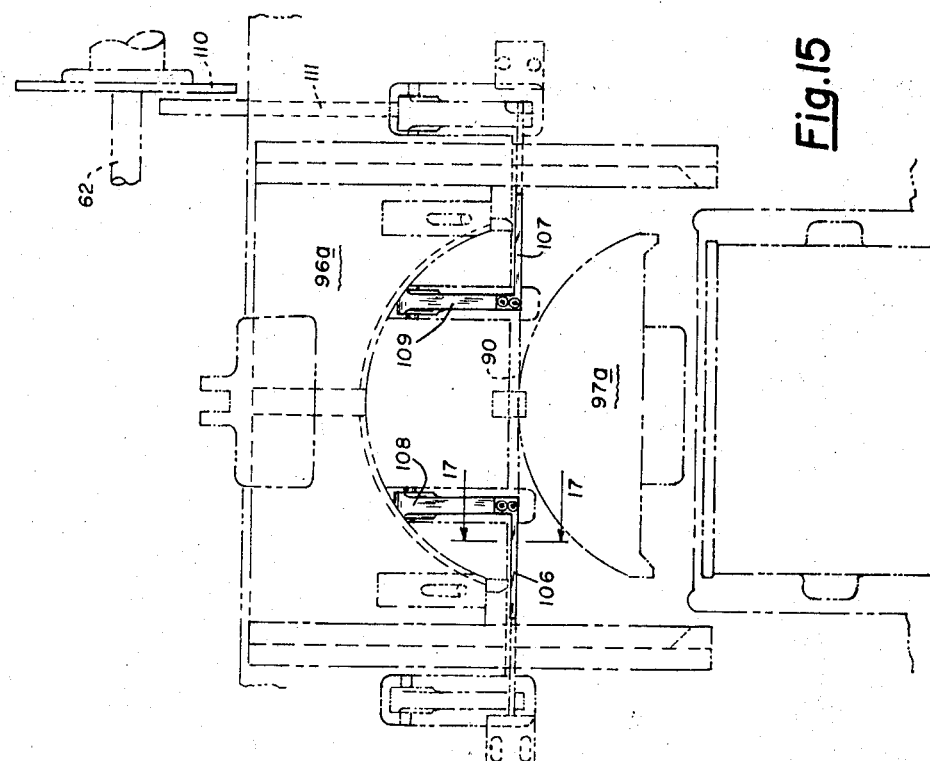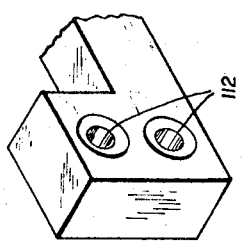

3,424,208
WIRE HANDLING APPARATUS
Raymond A. Heisler, 657 Dakota Trail,
Franklin Lakes, N.J. 07417
Filed July 5, 1966, Ser. No. 562,587
U.S. Cl. 140—93                        18 Claims
Int. Cl. B21f 45/00, 1/02

ABSTRACT OF THE DISCLOSURE

A wire handling apparatus for receiving, transporting and feeding wire through a bail-applying mechanism wherein wire is fed from a coil and into a wire straightener section. An eccentrically mounted wire feed is movable into and away from the path of the wire, this feed, when in engagement with the wire, is adapted for actuation to advance the wire in determined amounts through the straightener and into an automatic feed. An antibacklash wire guiding means having a sprag engaging the wire is disposed in the path of the wire. An automatic wire feed is provided in which a shiftable cam is adjustable to advance a determined feed length of wire, after which the feed is discontinued. After the feed of the wire is completed, the wire is cut to a precise length. The wire is carried in a covered wire groove feed path and as it is cut the cover is moved from the wire groove and the wire is transferred from the groove.

---

This invention pertains to wire handling apparatus, and particularly to improvements in wire handling apparatus as applied for providing bails on cans.

In particular, this invention relates to an improvement in the receiving, transporting and cutting of a wire particularly as used in apparatus such as is described in my U.S. Patent No. 3,241,578, issued Mar. 22, 1966. In the automatic providing of bails on cans in the manner and speed as particularly exemplified in apparatus of the type described in the foregoing patent, the attendant machinery providing other operations on the assembly line has been able to be speeded up to such an extent that this bail applying apparatus often must desirably be speeded up so that at the present time the bail applying apparatus is operating at rates to provide bails on cans at and in excess of sixty bails per minute. As the requirement for the speed-up of this machine has developed, it is necessary that this machine, at the higher speed of course, must maintain or improve its efficiency. Therefore, it is an intent of this invention to incorporate apparatus providing certain improvements in the handling of wire said improvements being particularly adapted for use on the machine as described in my U.S. Patent No. 3,241,578.

It is also noted that a broadened use of this type of apparatus has been made so as to provide bails on cans of 2 and 5 gallon sizes. The wire forming the bails for cans of these larger sizes has necessarily been of larger diameter than the wire for the bails used on 1 gallon cans. Accordingly, as the wire has become larger in diameter and more resistant to the operations of forming and feeding, it is desirable that certain manipulative apparatus assisting the operator in the loading and feeding of the machine be provided on this machine.

It is also to be noted that as the speed for the moving, cutting and forming of wire is increased in the bail applying apparatus and the like, and particularly wherein the diameter of the wire being used is increased in size, the efficiency and satisfactory operation of the apparatus depends upon precise and sure control of the wire through the various operations. As the wire increases in diameter, it is also much more difficult to feed and straighten and there is an increased memory or tendency of the wire to return to the coil form in which it is usually stored and shipped.

It is to be further noted that although wire of a specified size and temper is usually made within a diameter tolerance of a few thousandths of an inch the manufacturing variations from one manufacturer to another is such that wire feeding mechanism in order to be precise is also adjustable to accommodate the variations in wire diameter. As the wire temper during manufacture is rather difficult to control, the variations of the temper within the same coil and from severe abuse in shipping may cause the wire to have portions that are not able to be perfectly straightened during the passing of the wire through the straightening rolls. Such unstraight portions if deviating from the wire guideways may cause operational malfunction of the bail applying apparatus, or an incomplete bailing operation.

It is an object of this invention to provide improvements of the apparatus and means for receiving wire from a coil and to guide and transport this wire to and into a feeding device whereby the wire may be advanced forwardly by small increments into a straightener and in combination with this straightener to provide an antibacklash means so that the wire is prevented from moving backwardly and particularly during the cutting and forming operation, and subsequent to the straightening operation, to provide apparatus for the precise advancing of a determined length of the wire, after which there is a release of the gripping means of the wire advancing apparatus and of the feeding of the wire whereupon the wire may be cut. It is the further object of this invention to provide at a later station the means for precisely cutting and for precisely transferring the wire from a wire receiving groove into the wire forming operation of the bail applying mechanism, and wherein there is provided cover means for the wire transferring groove so that as the wire is fed into the groove the wire is prevented from any accidental dislodgment from the groove prior to the timed physical transfer of the wire from the groove into the bending dies.

It is a further object of this invention to provide means for precise, easy, one-man control of the operation of the apparatus wherein the wire is fed into the machine and is then processed or formed into a bail. Other objects and advantages of this invention will be apparent and understood from the following description in which specific details of a specific embodiment of the improvement shown in the accompanying drawings in which:

FIG. 2 represents in an enlarged view, a wire receiving and wire feeding means adapted for the receiving and guiding of a wire as received from a coil and feeding this wire to a straightener;

FIG. 3 represents a side view of a wire guide and looking in the direction of the arrows 3—3 of FIG. 2;

FIG. 4 represents a sectional view of the wire guide and taken on the line 4—4 of FIG. 3;

FIG. 5 represents a sectional view taken on the line 5—5 of FIG. 2 and showing an eccentric drive means for advancing the wire into the wire straightener;

FIG. 6 represents a plan view in enlarged scale of a portion of a wire straightener in which there is aligned and cooperating therewith an anti-backlash apparatus, the view being taken on the line 6—6 of FIG. 2;

FIG. 7 represents an isometric fragmentary view showing the antibacklash assembly;

FIG. 8 represents an exploded isometric view showing the spring and engaging dog of the antibacklash assembly of FIG. 7;

FIG. 9 represents an enlarged sectional view showing a wire driving mechanism the view looking in the direction of the arrows and taken on the line 9—9 of FIG. 1;

FIG. 10 represents an exploded isometric view showing the components forming the improved wire advancing drive of FIG. 9;

FIG. 11 represents an enlarged plan view showing the two geared drive components of the wire advancing means of FIG. 10;

FIG. 12 represents a fragmentary sectional view taken on the line 12—12 of one of the drive components of FIG. 11;

FIG. 13 represents a fragmentary sectional view taken on the line 13—13 of a mating drive component of FIG. 11;

FIG. 15 represents a front view showing in solid outline a pair of pushers adapted to engage and push the wire from a wire guide groove in the bail applying mechanism;

FIG. 16 represents an enlarged fragmentary end view of one of the pushers of FIG. 15;

FIG. 17 represents an enlarged sectional view of the pusher taken on the line 17—17 of FIG. 15;

FIG. 18 represents an isometric view showing the relationship and approximate size in relation to FIG. 15 of the pushers shown in FIG. 15;

Figure 1:
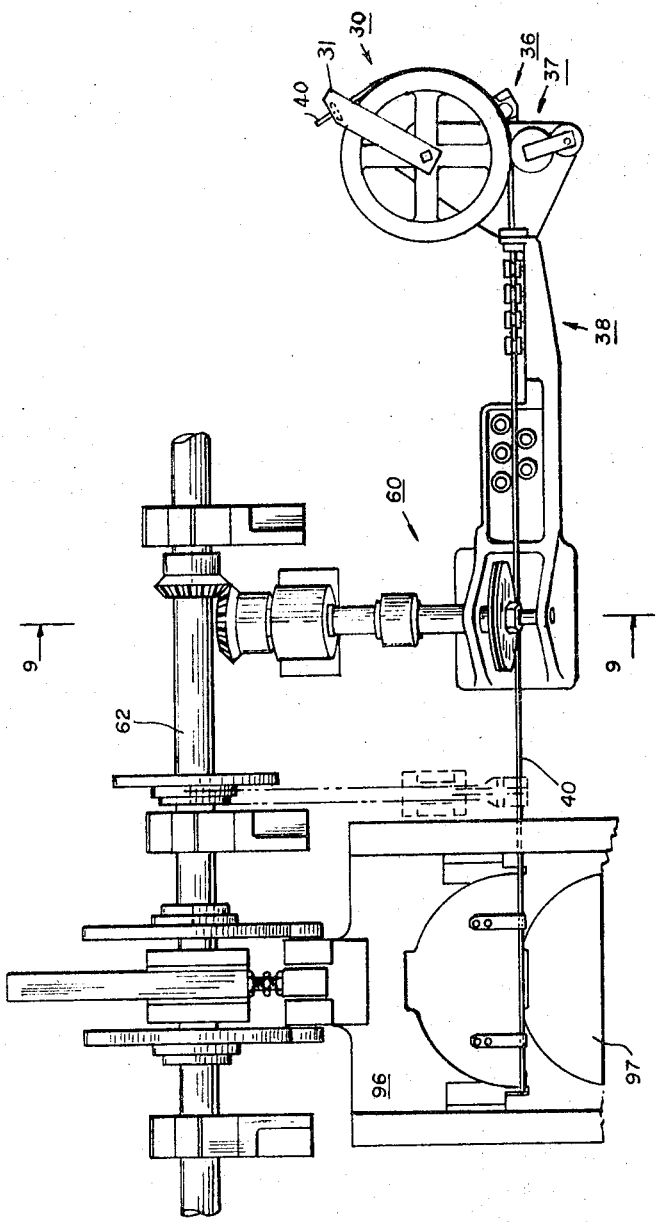
FIG. 1 represents a fragmentary front view showing the relationship of the various components forming a part of this invention.

Referring now in detail to the drawings wherein similar parts are identified with similar numbers, reference is had to FIGS. 1 thru 5, wherein a wire receiving and guiding device includes a wire guide assembly generally designated 30 and including an adjustable guide arm 31 having a wire guide 32 mounted on its outer end. The other end of arm 31 is pivotally carried by a stud 33 mounted in and extending at right angles from a support member 34. Rotatably mounted on stud 33 is a wire retaining and deflecting wheel 35 having a wire guiding groove formed in its periphery. Mounted on support 34 is a guide block 36 which is adapted to guide the outer portion of the wire. Upon a depending portion of the support 34 is mounted an advancing eccentric 37, while attached to a leftwardly extending portion of this support 34 is a wire guide, antibacklash and straightening apparatus generally designated 38 in FIGS. 1 and 2.

Wire 40 as seen in FIGS. 1 and 2 is fed from a supply reel not shown and enters the wire guide 32 and thence on to the wire wheel 35 and then is guided by the groove in the periphery of the wheel to pass between the periphery of the wheel and the guide block 36 thence past the advancing eccentric 37 and into the wire guide antibacklash device designated 38. As the wire is carried in the groove of the rotating wire wheel 35 and approaches and enters the guide block 36 the tapered guide portion 41 as seen in FIG. 3 acts as a retaining guide to maintain the wire in the groove formed in the periphery of the wheel 35. It is to be noted that block 36 is pivotally attached to the support member 34 by means of a bolt 42 and the guide portion 41 therein is adjustably movable to and away from wheel 35 by rotating the guide block assembly 36 as desired and retightening by means of a cap screw 43. A short distance to the left of guide block 36 there is mounted on member 34 an advancing eccentric means 37 which in the present instance is best seen in FIGS. 2 and 5. Pivotally retained upon a downwardly extending portion of the support 34 by means of cap screw 44 is an arm comprising an inner member 45 and an outer member 46 and carrying on its outer portion a knurled wheel 47 which is attached or keyed to a hex ended drive shaft 48 which is rotatably mounted in and is retained by the inner and outer arms. As particularly seen in FIG. 2 a stop pin 49 limits the forward rock motion or leftwardly swinging motion of the arm 45, 46 and the periphery of the wheel 35 limits the rightwardly swinging motion of the assembly 37 as when the knurled wheel 47 engages the periphery of the wheel 35.

In use the advancing eccentric is so disposed that as the wire 40 is brought from guide block 36 and is passed between the eccentric knurled wheel 47 and the groove wheel 35 a hex-head receiving drive wrench not shown may be engaged upon the hex end of shaft 48 and by the manipulation of the wrench the shaft and knurled wheel 47 is rotated. When the wheel 47 is rotated in the direction as indicated by the arrow of FIG. 2 the wire 40 is caused to be pinched between the knurled wheel 47 and the grooved portion of wheel 35 so that as the drive shaft 48 is rotated in a counter-clockwise direction the wire is caused to be frictionally engaged between the knurled wheel 47 and the wire wheel 35. The wire 40 is advanced leftwardly as the knurled wheel is rotated by rotating drive shaft 48, the force transmitted to the wire in causing the wire to advance necessarily causing the knurled wheel 47 to move to the right to further tightly engage the wire between the knurled wheel and the guide wheel 35. The wire is advanced as desired to the wire guide and antibacklash device 38 and after the wire has been passed through this assembly and to further operations to be later described the bail applying apparatus is then operated. This operation causes the wire to be advanced by other means whereby the knurled wheel 47 will be swung forwardly to the left so that after disengaging from the wire the inner and outer arm 45 and 46 moves leftwardly coming to rest upon stop pin 49. The knurled wheel 47 is thus dropped out of engagement with the wire 40 as it is advanced by other means to be described hereinafter.

Referring now to FIGS. 6, 7 and 8, the wire guide, antibacklash and straightening assembly generally indicated as 38 includes a wire guide 50 which, as shown, is in the form of a threaded member having a hexed exterior portion on one end and a passageway for the wire 40 through the center of the wire guide. This guide 50 is mounted in an upstanding portion 51 of a straightener base generally characterized as 52. A support block 53 is attached to or may be a part of the upright portion 51 and in addition to a passageway for the wire 50 through the block 53 there is provided means for mounting in the block a sprag 54 and a spring 55 which spring is attached to the block by means of a screw through hole 56 to the block 53. This screw 57 is best seen in FIG. 6. The wire 40 as seen in dashed outline in FIG. 6 and moving in the direction of the arrows engages a sloped portion provided on the wire-engaging end of the sprag 54 in such a manner that as the wire is pulled in the direction of the arrows the sprag is urged leftwardly against spring 55 and in this position permits the wire to pass freely by the engaging edge 54a.

After passing through the antibacklash device above described, the wire proceeds through the straightening section in which there are rollers 58 disposed on each side of the wire pathway through which the wire is caused to be moved. This type of roller straightener is of conventional design and no patentable significance is ascribed thereto. However it is to be noted that the sharp portion 54a of the sprag 54 is disposed so that when and if the wire 40 is caused to be moved backwardly in opposition to the direction of the arrows, the sprag and its sharp edge 54a engages the wire and by means of a wedging action provided by edge 54a and the opposite wall of the wire guideway prevents the wire from moving backwardly contrary to the direction of the arrows. This antibacklash device although of quite simple construction is very effective and as the wires contemplated for use in this apparatus range in size from diameters of ninety thousandths to more than one hundred twenty-five thousandths of an inch the sprag must needs be only approximately one-quarter of an inch square or less and needs to be of a length of about one-half inch or so and as disposed in the slot seen in FIG. 7 the sprag is retained in an operative position by means of the spring 55. When the wire in its forward motion is dragged across the engaged surface of the end of the sprag 54 the sprag is moved forwardly and the wire slides on the angled surface and when the wire attempts to move in the contrary direction the sharp edge 54a engages the wire and the inner side of the sprag 54 is moved rightwardly until it engages the inner end wall of the support block 53 whence it and the wire is caused to be stopped in its backlash motion.

Referring once again to FIG. 1 it is to be noted that the wire 40 after leaving the generally indicated straightened portion 38 proceeds to a wire advancing mechanism generally designated as 60 where it is best seen in more detail in FIGS. 9 through 13. Referring now to FIG. 9 in particular, the wire feeding mechanism as embodied in this invention includes a right angle bevel gear drive extending from a drive shaft 62 through a pair of bevel gears 63a and b and thence through shafts 64 and 65 operable as one shaft by means of a coupling 66. The shafts 64, 65 and couplings 66 are maintained in alignment by bearing blocks 67, 68 and 69 attached to and extending outwardly from a main plate 70. It is to be noted that these bearing blocks are disposed in such a manner that the shaft is extended at an angle to the main plate 70. A drive roller 71 and a following roller 72 as generally designated is shown in greater detail in FIGS. 10 and 11. As contemplated in this invention the driving roller 71 includes a bottom gear member 73 upon which is mounted a wire groove member 74 in which there is formed in the peripheral portion thereof a half circular groove extending around the complete circumference. This groove is sized so as to engage the particular diameter of wire being fed. The following roller 72 includes a bottom gear 73 which has a wire groove member 75 similar in all respects to groove member 74 except that an upper portion is formed to include a recess in which there is mounted certain shiftable cam portions designated 76, 77 and 78. These cam portions are radially retained on their inner edges by a shoulder 79 formed from and extending upwardly from the wire groove member 75. Screws 80 enter through radial slots in the cam portions 76, 77 and 78 and engage a threaded hole in the gear member 73. Mounted upon the top of the gear 73 of the driving roller 71 is a circular cam member 81 which is formed with a constant radial dimension. The circumferential cam 75 with the cam portions 76, 77 and 78 forming a part thereof engages this cam member 81 and provides a spacing between the cam groove of the driving and driven rollers 71 and 72. The cam portions 76, 77 and 78 have a greater radial extent than cam 75 so that when they come in the way of member 81 they cause rollers 71 and 72 to move away from each other so as to disengage from the wire. By adjusting the various cam portions in a radial relationship to the driven roller 71 it is practical to arrange the driving mechanism so that engagement of the wire occurs for a precise length of revolution and so that the advancement of the wire is made in such a manner that a precise amount of wire is fed to later cutting and bending operations.

A means responsive providing for a disengagement of the wire driving force is provided by the adjustable cam portions and the mating cam member 81. A biasing means urges the rollers 71 and 72 toward each other and in the preferred arrangement includes a bracket 82 in which is carried the driven roller 72. One end of bracket 82 is carried by a pivot block 83 mounted on main plate 70. Block 83 is maintained in pivotal relationship to the bracket 82 by means of a pivot pin 84. The opposite end of bracket 82 is formed with a clevis opening through which an adjusting screw 85 may be passed. This adjusting screw carries a spring 86 whose outer end engages the head of the screw and whose inner and end is adapted to engage the outer left portion of the bracket 82 and as the spring is compressed to urge this bracket towards the driving roller 71. As driving roller 71 is rotated in response to the bevel gear drive of bevel gears 63a and b the meshed gear members 73 of rollers 71 and 72 are rotated. The circular cam 75 with its adjusted cam portion 76, 77 and 78 as it is rotated brings these cam portions into engagement with the circular cam 81 of driven roller 71 whereupon the further extending portions 76, 77 and 78 cause the wire groove members 74 and 75 to be moved apart. This separating movement is calculated to provide a distance great enough so that the driving engagement of the wire is stopped. Although the rotation of the driving roller 71 is continued the cooperative driving of the wire 40 is discontinued until the cam portion 78 for example, is moved from engagement with the cam member 81 whereupon the spring 86 urges the groove members 74 and 75 toward each other and into cooperative relationship to each other so as to grasp and frictionally engage the wire and advance it forwardly.

Figure 14:
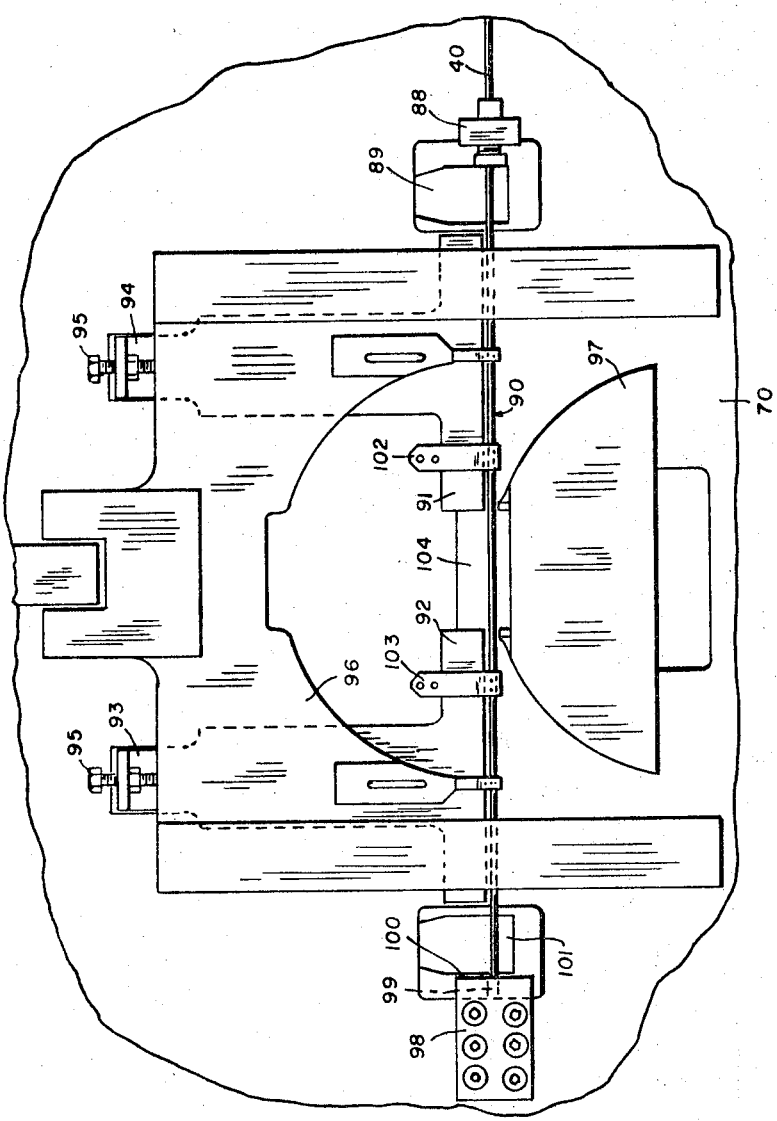
FIG. 14 represents a front view showing in enlarged scale a groove cover providing means for enclosing and forming a wire guide in the main plate of the bail applying mechanism and adapted to cooperate with means for uncovering the groove and transferring the wire to the U-forming dies.
Figure 19:
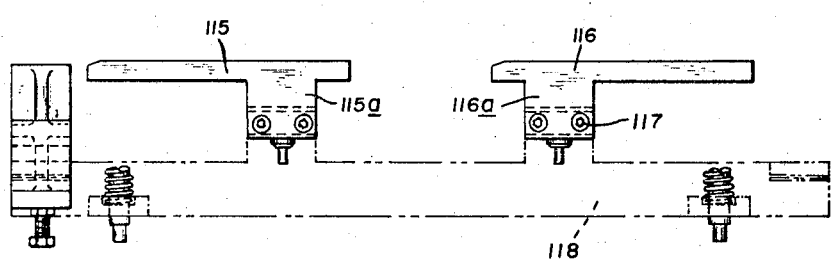
FIG. 19 represents a plan view of an alternate pusher assembly.
Figure 20:
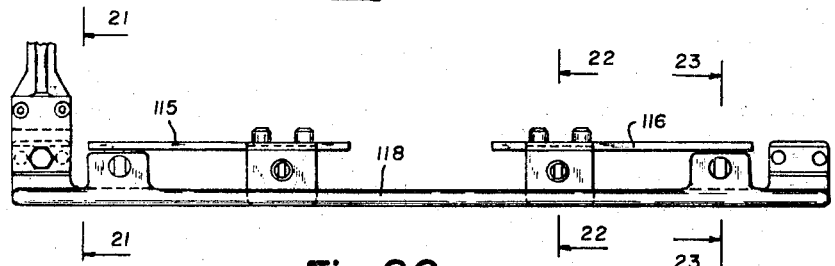
FIG. 20 represents a rear view of the pusher assembly of FIG. 19.

Referring now to FIG. 14, there is shown a modification of the main plate 70 in which there is provided an improved method and apparatus for providing a wire guideway in which the wire 40 after leaving the wire advancing station 60 is moved through a cutting die 88 and thence in front of a transfer and cutting blade 89. From in front of this blade the wire is moved into a wire guideway 90 which, as viewed in FIG. 14, is in the open position ready for the transfer of the wire 40 from the guideway into the way of the bending dies. In the present exemplification the main plate 70 is provided with right and left pocket portions within which are slidably retained the covers 91 and 92. The upper ends of covers 91 and 92 extend beyond the upper edge of the main plate 70. Said covers at their upper edge are provided with angled screw retainers 93 and 94 in which are threadably mounted screws 95 which are disposed so as to engage the upper edge of the upper U-die 96. This upper die 96 is retained in angled guideways and cooperates with the lower die 97 to bend a wire into a U-shape in the manner described in the Patent 3,241,578 above identified. The wire 40 as it is fed into position for the cutting and transfer as shown in FIG. 14 is guided so that the advancing end may engage an adjustable stop 98 which operates in a manner as previously described in conjunction with the above identified patent. It however is to be noted that stop 98 may be provided with a die portion 99 having a guideway adapted to receive the end of the fed wire so that this wire will extend into the guideway of die 99. A cutting edge 100 may be provided on the left transfer and cutting blade 101. As thus arranged the left end of the wire as viewed will be simultaneously cut with the advancement of the transfer and cutting blade 89 and 101. Cover retainers 102 and 103 which are affixed to the main plate 70 are not only adapted to provide a slide retaining means for the covers 91 and 92 but in their lowermost position also provide a stop for the wire as it is transferred out of the wire guideway 90. It is to be noted in FIG. 14 that a space 104 may be provided between the two covers 91 and 92 and also with an opening in the main plate 70 whereby through this opening rotatable handle portions not shown may be brought in the way of the wire 40 as it is fed into the guideway. After the wire has been transferred to the predetermined location between the bending dies 96 and 97 the bail applying mechanism may be activated whereupon the wire is bent and inserted into the ears of the container with the intermediate portions as exemplified by the space 104 retaining a rotary handle upon the formed bail.

It is to be noted that the cover retainers are responsive to the movement of the upper die 96 and importantly relate to the timing of the movements relative to the bending and inserting of a bail according to the bail applying mechanism of the above identified patent. This bail applying mechanism has its operational sequence adapted to advance the wire 40 into the groove 90 during the period of time the upper and lower dies 96 and 97 are closed and with the bent bail therein are moved downwardly to complete the operation of inserting the bail into the ears of the container. Accordingly when the upper die 96 is moved downwardly the covers 91 and 92 move downwardly to cover correspondingly adjacent portions of the groove 90. As the upper die 96 is moved toward and to its upper position, the arms 89 and 91 are being moved forwardly so that as the die 96 reaches its upper limit the wire is ready to be or is in the process of being cut and transferred from the groove 90. Prior to reaching its upper limit the upper edge of die 96 has engaged the screws 95 and as the die 96 proceeds upwardly carries the covers 91 and 92 upwardly to uncover the wire guideway 90. Adjustment of screws 95 provide means for precisely positioning the covers 91 and 92 so that they uncover the guideway 90 at the upper portion of the stroke of die 96. Of course if no space 104 is provided the covers 91 and 92 are preferably extended toward each other and are joined to form a single cover member for a continuous wire guideway 90.

Referring now to FIG. 15 it is to be noted that a mating pair of upper and lower dies 96a and 97a are of conventional curvature and do not have the space 104 (FIG. 14) provided therein. In this FIG. 15 is shown the means of providing the wire guideway 90 with positive pushers extending for substantial portions in the guideway 90. As seen in FIG. 18 these pushers preferably consist of two L-shaped members identified as 106 and 107 which members are attached to the pusher arms 108 and 109 which are similar to the arms as previously described in the above identified patent and which are now modified for the mounting thereto of these pushers 106 and 107 which are attached by means of cap screws or other attaching means. Arms 108 and 109 are pivotably swung in a manner previously described in the above identified patent and are moved in response to a cam 110 carried on and rotated by a drive shaft 62 which cam activates an arm 111 in a manner described in the above identified patent.

It is to be noted that as the wire 40 is fed into the guideway 90 and to the stop 98, which may or may not have the die receiving guideway 99, the wire passes in front of the pushers 107 and 106. These pushers present a smooth face to the wire in that they may be attached to the arms 108 and 109 by means of flat-head screws residing in countersunk holes 112 as best seen in FIG. 16. As this wire 70 is fed in the groove 90 (FIG. 17) and into position for the cutting and transfer of the wire the covers 91 and 92 if used will be in place so that a completely closed guideway 90 is provided whereby any bending or irregularity in the wire 40 will, as it is advanced, be controlled so that the wire will be positively contained and in position for transfer to a determined location in the way of the upper and lower dies 96 and 97 as they are brought together and moved downwardly in the manner adapted to precisely form and insert a bail into an eared can as previously described in the above identified patent.

Figure 21:
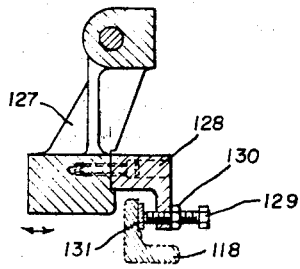
FIG. 21 represents an end view taken on the line 21—21 and looking at the direction of the arrows 21—21 of FIG. 20.
Figure 22:
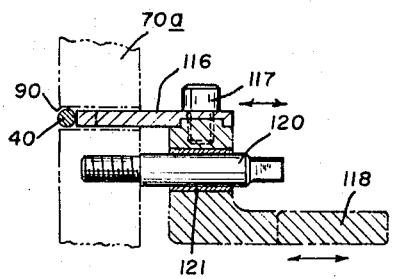
FIG. 22 represents a sectional view taken on the line 22—22 of FIG. 20.

Referring now to an alternate transfer means represented in the FIGS. 19 through 23 it is to be noted that in this embodiment a pair of pushers 115 and 116 are preferably attached as by bolts 117 to a support arm 18. This arm is attached and carried by the front plate 70a by a slide and guide means in such a manner that the pushers 115 and 116 are moved strictly in a single plane. This movement is contrary to the small arc performed by the transfer means described in conjunction with FIGS. 14 through 18. The attachment of support arm 118 is best seen in FIG. 22 in which a stud 120 is threadably mounted in the main plate 70a and carries the support arm 118 in a slidable manner in which support arm 118 is provided with bushings 121 so that as the support arm 118 is moved it is reciprocated forwardly and backwardly as indicated by the arrows and at right angles to the plate 70a.

Referring particularly to the FIG. 22 it is to be noted that the wire 40 as it lies in the wire guideway 90 may be advanced or pushed from this guideway by means of a forward movement of the support arm 118 whereupon the pusher 116 carried by arm 118 is also moved forwardly to discharge the wire 40 from the guideway 90. It is to be noted that the shank portions 115a and 116a of pushers 115 and 116 extend through the main plate 70a and are attached by means of screws 117 to the support arm 118.

Figure 23:
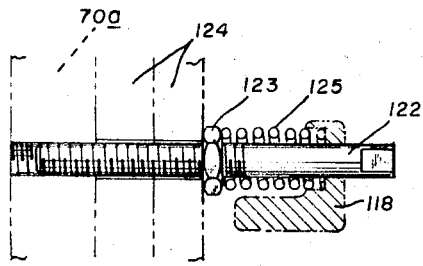
FIG. 23 represents a sectional view taken on the line 23—23 of FIG. 20.

Referring now to FIG. 23 it is to be noted that spring retainers 122 are threadedly mounted in plate 70a and that a hex nut 123 is also mounted upon this threaded end and engages other apparatus in the form of plate members 124, said plate members forming no part of this invention. Spring 125 is slidably retained by the spring retainer 122 and has one end engaging the face of a nut 123 with the other end of the spring engaging and being retained in a recess formed in the support arm 118. Spring 125 is a compression spring sized so as to be compressed a determined amount when so mounted. In this manner support arm 118 is biased outwardly and any forward movement of the arm 118 provides an additional compression of the spring 125.

Referring now to FIG. 21 it is to be noted that the pivoted arm 127 carries a screw block 128 which has mounted in its depending end an adjustable screw stop 129 in the form of a cap screw threadedly engaged in the depending portion of block 128 and having a jam nut 130 mounted thereon. It is to be noted that mounted upon support arm 118 at the point of engagement of the end of cap screw 129 there is provided a wear block 131 which may be replaceably mounted in or attached to the support arm 118. Pivoted arm 127 is controlled in its movement in the direction as indicated by the arrow by arm movement limiting means not shown. The arm is activated by a cam carried on the drive shaft 62 and operated in a similar manner to the cam apparatus as described in conjunction with the operation of the pushers described in conjunction with FIGS. 15 through 18.

It is to be noted that after the wire 40 has been moved into the guideway 90 that the forward movement of arm 127 in response to the cam activation causes the pushers 115 and 116 to move forwardly to disengage the wire 40 from the slot 90. As the cam on shaft 62 is rotated, the arm 127 is permitted to be moved backwardly. As the arm 127 is released by the cam the spring 125 urges arm 118 backwardly and thus the arm 127 is urged rearwardly. The pushers 115 and 116 connected to the bar 118 are likewise moved backwardly into the rearmost position occupied by appropriately formed reliefs in the guideway 90. This position is shown in FIG. 22. This arrangement is particularly useful in the apparatus requiring larger wire for production of bails for two and five gallon cans and is utilized so that the pushers 115 and 116 may be made more substantial in that the depth of the pusher lying within the guideway 90 is greater than the width of the guideway 90. Also noted is the fact that a pusher so arranged in such a slot may be reciprocated in a single plane permitting clearance between the pushers and the retaining slot to be in the neighborhood of only a few thousandths of an inch rather than in providing a clearance for an arc swing.

USE AND OPERATION

The wire handling apparatus of this invention in its use and operation is particularly directed toward apparatus of the type in the above identified U.S. patent and provides for an easier and surer wire control.

The wire 40 as it is delivered from a supply such as a coil or reel and to the guide assembly 30 is fed through a wire straightening section so that the wire will be straight for further operations. A single operator, no matter what the size and temper of the wire is able to precisely and with very little effort feed the wire by means of the advancing eccentric 37. After bringing the end of the wire through the guide block 36 the wire is directed to and into the passageway of the wire guide 50. The operator manipulates the knurled wheel 47 to bring the wheel into engagement with the wire and after engagement the wheel is rotated by means of a ratchet wrench, a crank or similar means which is engaged on the shaft 48. As the shaft 48 is rotated, which as shown is in a counter-clockwise direction, the wire is advanced. The greater the resistance of the wire to its advancement, the more the knurled wheel 47 engages the wire and moves it into the groove in the wire wheel 35.

After the end of the advancing wire passes the sprag 54 and is guided into the path through the straightening rollers 58, the antibacklash mechanism becomes effective in that the wire that has been fed past the sprag will be prevented by the sprag from moving in a counterflow direction. To permit reversal of the movement of the wire past the sprag it is necessary by auxiliary means to move the sprag against the spring and away from contact with the wire. To continue the movement of the wire into the bail applying apparatus, the operator continues to turn the knurled wheel 47 to advance the wire. After the wire has been advanced a few inches downstream from the straightening section the wire is guided into and enters and is engaged by the wire advancing mechanism 60.

This advancing mechanism 60 precisely advances the wire by means of the rotation of the driving and driven rollers 71 and 72. These rollers are rotated in response to the driving rotation of the drive shaft 62. Except when the adjusted cam portions 76, 77 and 78 are in engagement with the mating cam member 81, the mating groove members 74 and 75 grip and advance the wire as they are rotated. The precise adjustment of the cam portions 76, 77 and 78 determine the length of disengagement from the wire and hence the amount of wire fed during the engagement. After the advancing mechanism has gripped the wire and the bail applying mechanism has been started the need for and the use of the advancing eccentric ceases. As the wire is advanced by rollers 71 and 72, the knurled wheel 47 is also moved forwardly until it no longer engages the wire whereupon it drops forwardly until it rests on the pin 49.

After the wire leaves the advancing mechanism 60 it passes through the cutting die 88 and in front of the transfer and cutting blade 89. It then enters the wire guideway 90 and continues downstream until it is stopped by an adjustable stop 98 or enters the die portion 99. The advancing mechanism normally precisely advances the wire, but the stop is an insurance measure to compensate for a build-up of foreign matter on the rollers 71 and 72 or other factors that might cause a slight amount of extra wire to be fed to the bending dies. Particularly in the case of larger diameter wire where product control is more difficult it may be desirable to over feed as much as one-eighth of an inch of wire to be cut off by cutting edge 100. Where wire size and temper is reasonably consistent and where the wire is not subject to a large accumulation of dirt and similar build-up which may occur during transport of the coil, the use of a stop and/or cut off is not necessary. Exhaustive tests has demonstrated that all factors being reasonably consistent, thousands of wire length may be fed by the adjusted advancing mechanism and cut with a length variation of less than ten thousandths of an inch in overall length.

Covers 91 and 92, when used, are already in front of the guideway 90 when the wire is being fed therethrough. As the cams on the drive shaft 62 causes a lifting of the upper U-die 96, the covers 91 and 92 are lifted to uncover the guideway 90, whereupon the wire is cut and transferred to the bail forming and transfer position. The guideway 90 may be provided with the pushers of FIG. 18 in which the cutting and transferring mechanism is so constructed as to move the pushers 106 and 107 in an arc. The guideway may alternately be provided with a pusher arrangement as in FIG. 19 in which the pushers 115 and 116 are moved in a straight line.

The method of wire handling includes the following steps:

*receiving* a length of wire from a supply source such as a coil or reel;

*guiding* the wire to an advancing means;

*forwardly feeding* the wire in precisely controlled increments by means of an advancing eccentric apparatus;

*slidably retaining* the wire in a guide to bring the wire into a predetermined relationship with an antibacklash sprag;

*preventing* counterflow movement of the wire by means of an antibacklash means;

*straightening* the strand of advancing wire as it is moved through a wire straightening means;

*advancing* the wire by a wire advancing mechanism having meshed wire driving rollers, one of the rollers having an adjustable cam adapted to cause a disengaging of the wire advancing mechanism during a precise portion of its cycle of operation;

*moving* the wire through a guideway having an open side;

*covering* a portion of the open side of the guideway with movable covers during the advancing of the wire through the guideway;

*uncovering* the guideway by moving the covers from in front of the guideway during the cutting and transferring of the wire from the guideway; and

*transferring* the wire by means of pushers from the open guideway.

It is to be noted that the terms "right" and "left," "in" and "out" and "up" and "down" and similar terms are applicable to the apparatus as described in conjunction with the accompanying drawings and that such terms are merely for the purpose of description and do not necessarily apply to a position in which the apparatus or method may be used.

The invention in its broader aspects is not limited to the method and specific combinations shown and described but departures may be made therefrom within the scope of the accompanying claims without sacrificing its chief advantages.

What is claimed is:

1. In a wire handling apparatus adapted to receive, transport and cut wire, the apparatus having a precribed path for the passage of wire and being of a type such as may be used in bail applying mechanism and the like, the improvement in the handling of wire including: (1) means for receiving from a supply such as a coil of wire a length of wire and guiding this length of wire into said prescribed path; (2) means for guiding and transporting this length of wire to and through succeeding feeding devices; (3) an eccentrically mounted feeding apparatus adapted to be moved into and away from the path of the wire and when selectively moved into the path of the wire to engage this wire and upon actuation to advance the wire a desired amount; (4) subsequent to the eccentrically mounted feeding apparatus and aligned with the wire exiting therefrom, an automatic feeding apparatus having means for engaging, retaining and feeding said wire so that when said length of wire has been advanced to the automatic feeding apparatus this automatic feeding apparatus in response to an actuation of the wire handling apparatus will engage the wire and while thus engaged will advance the length of wire; (5) means for precisely discontinuing the wire engagement of the automatic wire feeding apparatus after the wire has been advanced a precise amount; and (6) means for cutting this precisely advanced length of wire.

2. Wire handling apparatus as in claim 1 in which the receiving and guiding means includes a wire retaining and deflecting wheel having a wire retaining groove therein; a support means and a shaft member carried by the support means, said wheel being rotatably mounted on the shaft member; a guide arm having one end pivotally mounted on said shaft member and carrying on its other end a wire retaining guide disposed to receive the wire from the coil of wire and to guide this wire into the groove of the wheel; and a guide block mounted on the support means and movable toward and away from the wheel, the block having a deflecting guide portion adapted to retain and guide the wire in the wire groove of the wheel as the wire is carried around the wheel the groove providing means for maintaining the advancing wire in a prescribed path.

3. Wire handling apparatus as in claim 1 in which the receiving and guiding means includes a wire retaining and deflecting wheel having a wire retaining groove therein, and in which said eccentrically mounted feeding apparatus includes a support means; a shaft member mounted on the support means; an arm pivotally carried by the shaft member; a friction surfaced wheel rotatably carried by one end of the arm, the arm disposed to be swung so as to bring the friction surfaced wheel into engagement with a wire in the groove of the wire wheel and when the arm is so swung the friction surfaced wheel is disposed to engage the wire in a wedging action; means for rotating the friction surfaced wheel so that when the arm is so swung and the friction surfaced wheel is caused to be rotated the wire will be frictionally engaged and urged forwardly.

4. Wire handling apparatus as in claim 3 in which the friction surfaced wheel is fixedly attached to a shaft carried in the end of the pivoted arm; means on one end of the shaft for the removable engagement of the shaft and the turning thereof by a wrench and the like; and in which there is a stop provided on the support member, said stop adapted to engage the arm when the friction surfaced wheel is moved from engagement with the wire.

5. Wire handling apparatus as in claim 2 in which the eccentrically mounted feeding apparatus includes a first shaft carried by the support means; an arm pivotally carried by the first shaft; a second shaft rotatably carried in the swinging end of the arm; a friction surfaced wheel fixedly attached to, carried by and rotatable with the second shaft, the second shaft having one end sized so as to be engaged by a wrench and the like; the arm adapted to be sung unwardly so as to bring the friction surfaced wheel into engagement with a wire carried in the groove of the wire wheel and when the arm is so swung upwardly the friction surfaced wheel will engage the wire in a wedging action whereby when the second shaft and attached friction surfaced wheel is caused to be rotated, said wheel will engage the wire and urge the wire forwardly and when, instead of by the eccentric means, the wire is caused to be advanced by the automatic feeding apparatus the friction surfaced wheel will be drawn forwardly by the wire thus causing the arm to move in a forward arc until the friction surfaced wheel becomes disengaged from the wire after which the arm is allowed to swing downwardly; and a stop attached to the support means, the stop disposed to engage and support the arm in a rest position in which position the friction surfaced wheel is out of the path of the advancing wire.

6. Wire handling apparatus as in claim 5 in which there is disposed between the eccentric feeding apparatus and the automatic feeding means, a wire straightener having in combination therewith an antibacklash device having a wire guideway therethrough and providing a prescribed wire path; a sprag residing in a shouldered retaining groove in the antibacklash device, the sprag slidable in a single plane, the groove having longitudinal limiting means so as to provide a stop for the longitudinal movement of the sprag; a shoulder in one side of the groove and disposed so as to engage and stop the rearward movement of the sprag; a spring arranged so as to engage the sprag and urge the sprag rearwardly against the shoulder and with a sharp one end of the sprag movable into the path of the advancing wire whereby the sprag is moved against the spring and from the way of the wire by said wire as it is moved forwardly and when and if the wire is caused to be moved rearwardly the spring urges the sprag so that the sharp end of the sprag engages the wire and as it engages the rearwardly moving wire the sprag end is moved rearwardly so as to pinch the wire between and against an opposite wall of the wire guideway so as to lock the wire between the sharp end of the sprag and the guideway whereby the engagement of the sprag with the shoulder of the groove stops the rearward movement of the sprag and the pinched wire.

7. Wire handling apparatus as in claim 1 in which the automatic wire feeding apparatus and the means for precisely disengaging this feeding apparatus after a precise amount of wire has been fed includes a drive means engaged with and movable in response to a drive shaft operating the wire forming apparatus; a drive roller which is a rotatable member portion of the wire feeding apparatus and having a first gear member of determined pitch and teeth; a first wire groove member carried by said gear member and rotatable therewith; a following roller having a second gear member of determined pitch and teeth and adapted to mesh with and be rotated in response to the rotation of the first gear member; a second wire groove member carried by the second gear and rotatable therewith; biasing means for urging the following roller toward and to the drive roller and adapted to align the rollers so that the second wire groove member in combination with the first groove member will grip a wire and as the meshed gears are rotated the cooperating wire groove members will be rotated and the gripped wire therebetween will be advanced; and, at least one shiftable cam portion carried on the second wire groove member and adapted to engage the outer circumferential surface of the first wire groove member so as to move the second wire groove member from driving engagement of the wire, the shiftable cam movable and relockable on the wire groove member so as to provide a selected precise portion of disengagement and a precise duration of engagement which length of engagement provides a predetermined length of advancement of the wire.

8. Wire handling apparatus as in claim 7 in which the following roller is carried by a bracket; a main hinge support member providing means for pivotally mounting and carrying one end of the bracket; an adjusting screw threadly mounted in the support member; means on the other end of the bracket to slidably engage and be supported by the adjusting screw; a spring carried by the adjusting screw and adapted to urge the bracket and the roller toward the drive roller; and in which the shiftable cam portion of the following roller is provided with a plurality of shiftable cam segments radially retained on their inner edge by means of a radially disposed shoulder on the second wire groove member, the shiftable cam segments having a greater radial extent than the remaining cam surface formed on the second wire groove member, the cam segments having lapped ends and the shiftable cam segments being removably retained on the second wire groove member.

9. Wire handling apparatus as in claim 6 in which the automatic wire feeding apparatus and the means for precisely disengaging this feeding apparatus after a precise amount of wire has been fed includes a drive means engaged with and movable in response to a drive shaft operating the wire forming apparatus; a drive roller which is a rotatable member portion of the wire feeding apparatus and which includes a first gear member of determined pitch and teeth; a first wire groove member carried by said gear member and rotatable therewith the wire groove member providing a circular cam surface of a determined equal radius; a following roller having a second gear member of determined pitch and teeth and adapted to mesh with and be rotated in response to the rotation of the first gear member; a second wire groove member carried by the second gear and rotatable therewith, the wire groove member having a cam surface adapted to engage the cam surface of the first wire groove member; a shiftable cam portion in the cam portion of the second wire groove member, said cam portion having a plurality of shiftable cam segments radially retained on their inner edge by means of a radially disposed shoulder on the groove member, the shiftable segments having a greater radial extent than the remaining cam surface formed on the second wire groove member, the shiftable cam segments being removably retained on the second wire groove member; a bracket adapted to rotatably retain the following roller; a main hinge support member providing means for pivotally mounting and carrying one end of the bracket; an adjusting screw threadedly mounted in the support member; means on the other end of the bracket to slidably engage and be supported by the adjusting screw; a spring carried by the adjusting screw and adapted to urge the bracket and the roller toward the drive roller so that the second wire groove member in combination with the first groove member will grip a wire and as the meshed gears are rotated the cooperating wire groove members will be rotated and the gripped wire therebetween will be advanced and as the shiftable cam portion engages the cam surface of the first wire groove member the second wire groove member will be moved from driving engagement of the wire so as to provide a selected precise portion of disengagement and a precise duration of engagement of the wire which length of engagement provides a predetermined length of advancement of the wire.

10. In a wire handling apparatus adapted to receive, transport, cut, and to provide a prescribed path for the passage of wire, said apparatus being of a type such as may be used in the forming and inserting of wire bails into the ears of eared containers, the improvement providing an apparatus for a wire guideway enclosed during the movement of the wire into the guideway and having means for opening one side during the transfer of the wire from the guideway, said improvement comprising: (a) a wire guideway provided in the wire handling apparatus and having at least two substantially opposed portions of the guideway as fixed portions of the guideway; (b) means for feeding a precise length of wire into the wire guideway; (c) a movable cover adapted to close a side of the guideway during a determined portion of the cycle of operation and at least during the feeding of the wire into the guideway; (d) means for moving said cover from a side of the guideway during a portion of the cycle of operation so as to permit the wire to be moved from the guideway; and (e) means for transferring the wire from the guideway to other wire retaining means and operations.

11. Wire handling apparatus as in claim 10 in which the means to transfer the wire includes at least one positive pusher recessed in the rear wall of the guideway and disposed so that the face of the pusher will form a non-obstructing wire guiding surface with the rear wall of the guideway; a mounting means attached to and supported by the wire handling apparatus; an arm pivotally swung from the mounting means and having means for mounting the pusher on the depending end thereof; and means adapted for swinging the arm and the attached pusher to move the wire from the guideway.

12. Wire handling apparatus as in claim 11 in which there are two L-shaped positive pushers each attached to a dependent arm with the shorter arm portion extending upwardly from the guideway and with the longer arm portion disposed to lie in the recess adjacent the guideway.

13. Wire handling apparatus as in claim 11 in which at least one movable cover is provided with cover guide means for maintaining the cover in a prescribed plane forming one side of the guideway, and the means to move the cover includes upper and lower bail forming dies movable in the wire handling apparatus; an upper edge formed on the upper die; an upwardly extending portion formed on the cover; a retainer extending from the upwardly extending portion of the cover and disposed to lie above the upper edge of the upper die; an adjustable member carried in the retainer and disposed so as to be in the way of and engage the upper edge of the upper die as this die is moved upwardly wherein the adjustable member is engaged so as to lift the cover and to move the cover from the guideway so as to open the guideway at that portion of the cycle of operation when the upper bail forming die is substantially at the beginning of the bail forming cycle of the wire handling apparatus.

14. In a wire handling apparatus adapted to receive, transport, cut and to provide a prescribed path for the passage of wire, said apparatus being of a type such as may be used in the forming and inserting of wire bails into the ears of eared containers, the improvement providing an apparatus for a wire guideway having a positive wire transferring means and comprising; (a) a wire guideway provided in the wire handling apparatus and having at least two substantially opposed portions of the guideway as fixed portions of the guideway; (b) means for feeding a precise length of wire into the wire guideway; (c) a wire transfer means including at least one pusher bar lying in a recess adjacent the wire guideway; (d) means for adjusting the pusher so that the face of the pusher forming the rear wall of the guideway is disposed to form a non-obstructing wire guiding surface with other portions of the rear wall of the guideway; (e) means for moving the pusher transversely in the guideway to transfer the wire from the guideway; (f) guide means for maintaining the pusher in a single plane during the transverse movement; and (g) means for returning the pusher to the receiving recess adjacent the guideway so that a new length of wire may be fed into the guideway.

15. Apparatus as in claim 14 in which the guide means for maintaining the pusher in a single plane includes a support arm carried by a slide and guide means attached to the wire handling apparatus, the pusher attached to and carried by the support arm and in which the means for returning the pusher to the receiving recess is at least one spring adapted to engage the support arm and move it backwardly.

16. Apparatus as in claim 15 in which the pusher is of a thickness slightly less than the width of the guideway and with the depth of the pusher greater than the thickness of the pusher.

17. Apparatus as in claim 15 in which at least a portion of one side of the guideway is provided with a movable cover and includes guide means for maintaining the cover in a prescribed plane during its movement; means for moving the cover to close a side of the guideway during a determined portion of the cycle of operation and at least during the feeding of the wire into the guideway; and means for moving said cover from a side of the guideway during a portion of the cycle of operation so as to permit the wire to be moved from the guideway as the pusher is moved forwardly.

18. Wire feeding apparatus providing means for precisely disengaging this feeding apparatus after a precise amount of wire has been fed, the wire feeding apparatus including; a drive roller which is a rotatable member portion of the wire feeding apparatus and having a first gear member of determined pitch and teeth; a first wire groove member carried by said gear member and rotatable therewith; a following roller having a second gear member of determined pitch and teeth and adapted to mesh with and be rotated in response to the rotation of the first gear member; a second wire groove member carried by the second gear and rotatable therewith; biasing means for urging the following roller toward and to the drive roller and adapted to align the rollers so that the second wire groove member in combination with the first groove member will grip a wire and as the meshed gears are rotated the cooperating wire groove members will be rotated and the gripped wire therebetween will be advanced; and, at least one shiftable cam portion carried on the second wire groove member and adapted to engage the outer circumferential surface of the first wire groove member so as to move the second wire groove member from driving engagement of the wire, the shiftable cam movable and relockable on the wire groove member so as to provide a selected precise portion of disengagement and a precise duration of engagement, which length of engagement provides a predetermined length of advancement of the wire.

References Cited

UNITED STATES PATENTS

| 496,314 | 4/1893 | Johnson | 140—140 |
|---|---|---|---|
| 625,351 | 5/1899 | Page | 140—140 |
| 641,177 | 1/1900 | Young | 140—140 |
| 1,435,438 | 11/1922 | Wright | 140—140 |
| 1,625,850 | 4/1927 | Gedien et al. | 140—140 |
| 2,511,274 | 6/1950 | Kramer | 117—66 |
| 3,241,578 | 3/1966 | Heisler | 140—93 |

FOREIGN PATENTS 732,873  6/1955  Great Britian.

CHARLES W. LANHAM, *Primary Examiner.*

E. M. COMBS, *Assistant Examiner.*

U.S. Cl. X.R.

140—140